July 17, 1962 R. J. DAVIES 3,044,761
FLUID SPRING ASSEMBLY
Filed March 2, 1959 2 Sheets-Sheet 1

INVENTOR
Raymond John Davies
by Benj T. Rauber
his attorney

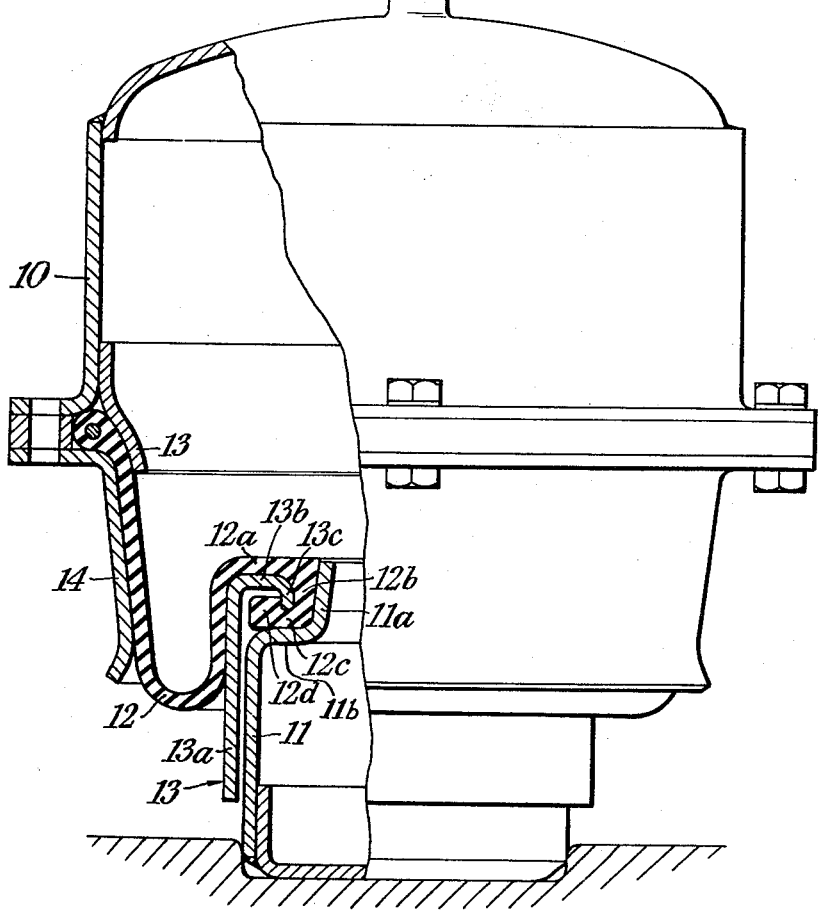

United States Patent Office 3,044,761
Patented July 17, 1962

3,044,761
FLUID SPRING ASSEMBLY
Raymond John Davies, Coventry, England, assignor to Dunlop Rubber Company Limited, London, England, a British company
Filed Mar. 2, 1959, Ser. No. 796,352
Claims priority, application Great Britain Mar. 6, 1958
12 Claims. (Cl. 267—65)

This invention relates to fluid springs, particularly for use in suspension systems for vehicles and the like.

Fluid springs are known comprising an inflatable bellows-member, of single, double or treble convoluted configuration, the two ends of which are fluid-tightly secured to relatively movable parts of the vehicle structure. Other types of fluid springs are known comprising a pressure fluid container, a plunger loosely movable therein and a flexible diaphragm fluid-tightly secured at its inner periphery to the plunger and at its outer periphery to the container. Difficulties have been experienced in effectively and economically securing the ends of the bellows or the peripheries of the diaphragm, as the case may be, to the relatively movable parts with which they are associated and the object of the present invention is to provide a fluid spring assembly wherein this difficulty is overcome.

According to the present invention a fluid spring assembly comprises a flexible fluid-tight member having opposite ends associated with respective ones of a pair of relatively movable members, and having at least one end edge portion compressed in fluid-tight engagement between a tapered part of one of said movable members and one edge of an annular pressure plate.

Preferably said edge includes an axially extending portion and a radially-extending portion which, when the spring is under pressure, is fluid-tightly pressed against a radially extending part of said movable member by the pressure plate.

The fluid spring may be a bellows-member the ends of which are fluid-tightly secured to plates which in turn are adapted to be secured to a part of the vehicle chassis and to a part of the unsprung wheel assembly respectively. Said ends are both provided with beaded edges, the inner peripheries of which make fluid-tight engagement with a part of an associated plate to form a primary sealing zone and an annular pressure plate is provided which is deflected by the bellows-member, on pressurization thereof, to force a part of the beaded edge against another part of said plate to form a secondary sealing zone, the efficiency of which increases with an increase in the pressure within the bellows-member.

In order that the invention may be better understood and carried into practice, reference will now be made to the accompanying drawings, wherein:

FIGURES 6 and 7 are sections on the line VI—VI and VII—VII respectively of FIGURES 4 and 5, on the enlarged scale; and FIGURE 8 is a part-sectional elevation of another fluid spring assembly, comprising a flexible diaphragm.

Figure 1:
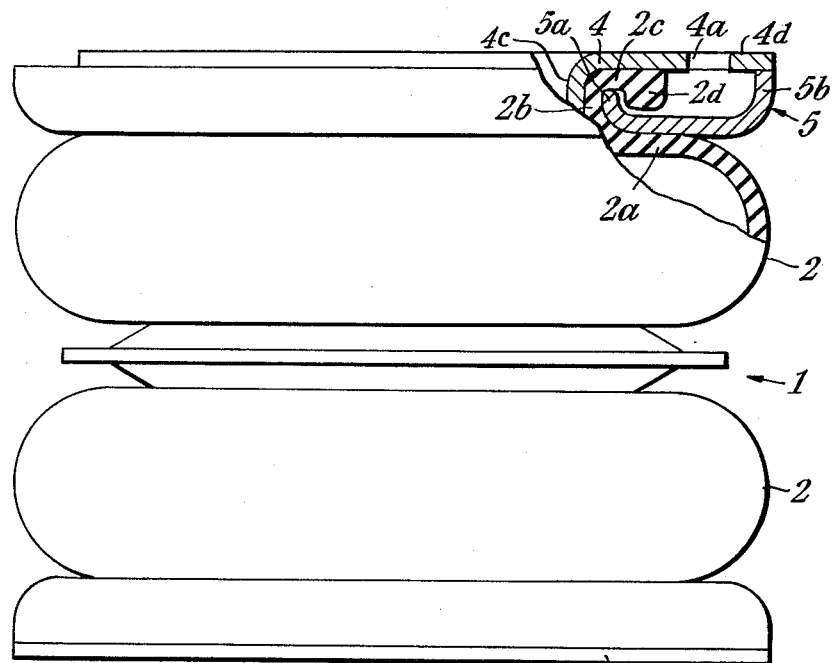
FIGURE 1 is an elevation, partly in section, of a fluid spring assembly comprising a bellows.
Figure 2:
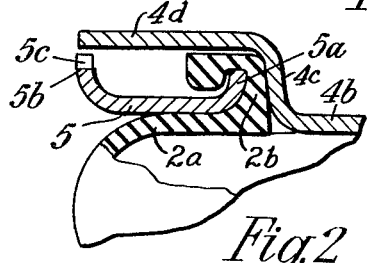
FIGURES 2 and 3 are detailed views, partly in section, showing part of the assembly.
Figure 3:
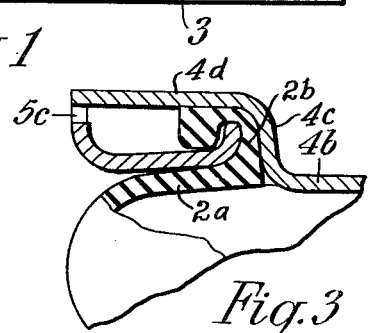

The spring shown in FIGURES 1-3 comprises a bellows member 1 made of rubber or like resilient material provided with a textile cord reinforcement, and is of double-convoluted configuration, i.e. it comprises two integrally-united axially-aligned and equal size tori 2, located between a lower plate 3 which is adapted to be secured to an axle or similar unsprung portion of a vehicle and an upper plate 4 which is adapted to be secured to a chassis or frame or similar sprung part of the vehicle, by means such as bolts passed through holes 4a in the upper plate.

The upper and lower ends of the bellows and the associated upper and lower plates are identical, and only the upper end will be described.

The upper flexible wall 2a of the bellows is substantially radially extending, and is united to an axially and upwardly extending annular portion 2b, the inner periphery of which is cylindrical. From the upper end of this annular portion 2b an annular flange 2c extends radially outwards terminating in a lip 2d of substantially square section which extends generally downwardly towards the upper flexible wall 2a of the bellows-member and with said wall and the portion 2b defines an annular recess. The upwardly-extending annular portion, the annular flange and the lip together constitute a beaded edge of the bellows-member and said beaded edge is flexible and distortable, i.e. it is not provided with an inextensible wire or like reinforcement.

The upper plate 4 with which the said bead is associated is circular and is provided centrally with a substantially cylindrical dished portion 4b (see FIGURES 2 or 3) which extends downwardly therefrom and is coaxially with the bellows-member. The outer periphery of said dished portion, which forms a seating for the inner periphery of the beaded edge of the bellows-member, is a very slightly tapered annular wall 4c so that the base of the dished portion is of smaller diameter and is of such dimensions that said inner periphery is adapted to make fluid-tight wedging engagement with the said beaded edge. From the larger diameter end of the annular wall 4c, the plate 4 extends in a radially extending wall 4d.

An annular pressure plate 5 is provided, the inner peripheral edge of which has an annular lip 5a extending axially in one direction and the outer periphery is provided with an annular flange 5b extending axially in the same direction. Said pressure plate is fitted to the beaded edge of the bellows-member, before said member is fitted to the upper plate, with the inner peripheral lipped edge 5a fitting in the annular recess defined between said beaded edge 2d and the adjacent flexible wall 2b of the bellows-member. The annular flange 2c and lip 2d of the said edge are deformed radially-inwards to enable the plate to be fitted thereto, and the upper plate 4 is then fitted, the inner periphery of the beaded edge making fluid-tight and wedging engagement with the tapered annular wall portion 4c of the upper plate and the annular flange 2c of the beaded edge abutting the flat annular portion of said upper plate; in this position the rim of the annular flange 5b on the pressure plate abuts the outer peripheral portion of said upper plate, as shown in FIGURE 1.

The initial stage of the fitting operation is performed manually, FIGURE 2 showing the assembly at this stage, while the final stage of the fitting operation is performed by inflating the bellows which, in effect, blows the bellows-member onto the edge plates as shown in FIGURES 1 and 3.

The cylindrical neck 2b of rubber or like material forming the beaded edge of the bellows-member is thus compressed and wedged tightly between the tapered annular wall portion 4c of the upper plate and the inner peripheral edge 5a of the pressure plate and this forms a primary sealing zone which prevents leakage of pressure fluid when the bellows-member is only lightly pressurized. On increasing the pressure within the bellows-member the flexible wall 2a thereof tends to distort axially of the bellows and this deflects the lipped end 5a of the pressure plate toward the plate 4, the lipped end thereof compressing the annular flange 2c comprising the beaded edge edge of the bellows-member upwardly against the flat annular portion of the upper pressure plate 4 to form a secondary sealing zone the sealing efficiency of which increases substantially directly with the increase in inflation pressure in the bellows-member. Thus the higher the inflation pressure the better the sealing effect obtained at the secondary sealing zone. The pressure plate deflects about its outer peripheral flanged portion which abuts the upper plate and is of such dimensions and is made of such a material as will readily deflect under load and will readily recover from such deflection.

The flanged portion of the pressure plate is provided with cut-away portions 5c (FIGURES 2 and 3) to enable a tire lever or like instrument to be inserted to facilitate removal of the bellows-member and pressure plate from the upper plate.

Figure 4:
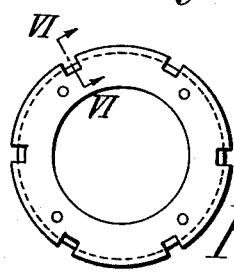
FIGURES 4 and 5 are plan views, on a reduced scale, of modified assemblies comprising bellows.
Figure 5:
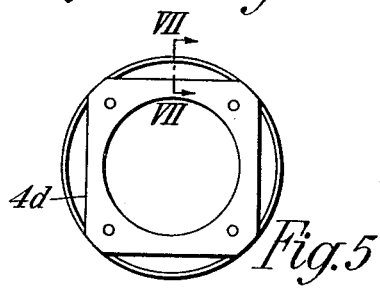

In the modified assembly shown in FIGURES 4 and 6, the pressure plate is not slotted but the upper plate has slots 4c for the same purpose; and in the modified assembly of FIGURES 5 and 7 the upper plate has four straight sides 4d, again for the same purpose.

The spring shown in FIGURE 8 comprises a pressure-fluid container 10, a cylindrical plunger 11 which is movable into the container, and a diaphragm 12.

The outer periphery of the diaphragm has a beaded edge which is trapped in a recess formed by the container, a retaining ring 13 and a guide sleeve 14.

The inner peripheral and marginal zone 12a of the diaphragm is united to an axially and downwardly extending annular portion 12b, and the inner periphery of the latter is cylindrical. From the lower end of the portion 12b an annular flange 12c extends radially outwards and terminates in a lip 12d of substantially square section which extends upwardly towards the zone 12a and with said zone and the portion 12b defines an annular recess. The portions 12b, 12c and 12d together constitute a beaded edge which is flexible and distortable, i.e. is not provided with any reinforcement.

The plunger 11 has a reduced diameter annular wall 11a to which the diaphragm is connected, and the outer surface of the wall is tapered slightly, the smaller diameter being at the free end. From the larger diameter end of the wall 11a extends a radially extending wall 11b.

An annular pressure plate 13 comprising a cylindrical skirt 13a, a radial and inwardly projecting flange 13b and a lip 13c extending in the same direction as the skirt, is associated with the plunger.

The spring shown in FIGURE 8 is assembled in a similar manner to that of the spring shown in FIGURE 1, so that the flange 13b abuts the marginal zone 12a the lip 13c engages in the recess, and the inner periphery of the annular portion 12b makes wedging engagement with the head of the plunger. The wedging forms a primary sealing zone, and increase of pressure in the spring tends to force the marginal zone 12a, towards the plungers so that the lipped pressure plate urges the diaphragm flange 12c on to the shoulder between the head and the skirt of the plunger, to create a secondary sealing zone the efficiency of which increases substantially directly with the increase in inflation pressure in the spring.

If desired, one or both ends of a spring assembly comprising a convoluted bellows and a rolling lobe-type diaphragm may be compressed in fluid-tight engagement with a pressure plate or plates in the manner above described.

Having now described my invention, what I claim is:

1. A fluid spring assembly which comprises a pair of spaced end members movable toward and from each other, a resilient, flexible enclosing wall between and joined fluid-tightly to said end members to form a fluid-tight enclosure, at least one of said end members having a radially extending wall portion and an annular wall portion having an outer surface tapering radially inwardly from said radially extending wall portion, said enclosing wall having a portion extending radially inwardly to the smaller diameter end of the tapering surface of said end member, thence in contact with said tapered surface and thence radially outwardly adjacent the radially extending wall portion of said end member and spaced from the inwardly extending portion of said enclosing wall, and an annular pressure member between said inwardly and outwardly extending portions of said enclosing wall in wedging contact with said tapering surface through said enclosing wall and movable by said inward extension of said enclosing wall toward the larger diameter portion of said tapering surface.

2. A fluid spring assembly according to claim 1 wherein said pressure member comprises an inner peripheral edge extending towards the radially-extending part of said end member and adapted to compress the outwardly extending portion of said enclosing wall against said part when the spring is under pressure.

3. A fluid spring assembly according to claim 2 wherein said pressure member comprises an outer peripheral edge extending axially towards and abutting said radially extending part.

4. A fluid spring assembly according to claim 3 wherein the inner periphery of said pressure member abuts a flexible, distensible wall of said enclosing wall and the inner peripheral edge of said pressure member is adapted to be deflected axially outwardly by said wall when the fluid-tight member is under pressure.

5. A fluid spring assembly according to claim 1 wherein said enclosing wall is substantially cylindrical and is a convoluted bellows member and said end members are adapted to be secured to a part of a vehicle chassis and to a part of an unsprung wheel assembly respectively.

6. A fluid spring assembly according to claim 1 wherein means are provided to permit a lever to be inserted between said pressure plate and said end member to facilitate removal of the fluid-tight member.

7. A fluid spring assembly according to claim 1 wherein said enclosing wall is substantially-cylindrical and is an annular rolling-lobe-type diaphragm and in which said end members comprise respectively a container and a plunger to be secured to a part of a vehicle chassis and to a part of an unsprung wheel assembly respectively.

8. A fluid spring seal comprising an end member having an annular tapering portion and a flange extending transversely therefrom; a flexible, fluid-tight, hollow member having at least one end formed with an axially-extending annular portion in contact with the annular tapering portion of said end member, a second portion facing and in contact with said flange and a third portion spaced from said second portion and facing the interior of said hollow member; and an annular pressure plate between said second and third portions and abutting said axially extending annular portion to receive the pressure of fluid in said hollow member through said third portion to wedge said axially extending annular portion fluid-tightly against said annular tapering portion of said end member and to press said second portion fluid-tightly against said flange.

9. A fluid spring assembly according to claim 8 wherein said hollow member is a convoluted bellows-member.

10. A fluid spring assembly according to claim 8 wherein said hollow member is an annular rolling-lobe-type diaphragm, and said end is a periphery thereof.

11. A fluid spring assembly according to claim 8 wherein said hollow member comprises at one end a bellows-member and at the other end a rolling-lobe-type diaphragm.

12. A fluid spring assembly comprising a pair of spaced end members movable toward and from each other, at least one of said end members having an annular tapering portion and a flange extending transversely therefrom; a flexible, fluid-tight, hollow member extending between and sealed fluid-tightly to said end members, one end of said hollow member comprising an axially extending annular portion encircling said annular tapering portion of said end member, a second portion facing and in contact with said flange and a third portion spaced from said second portion and exposed to fluid pressure within said hollow member; and an annular pressure plate between said second and third portions and abutting said axially extending annular portion of said hollow member to receive fluid pressure on said second member to wedge said axially extending portion of said hollow member fluid-tightly against said annular tapering portion of said end member and to press said second portion fluid-tightly against said flange.

References Cited in the file of this patent

UNITED STATES PATENTS

| | | |
|---|---|---|
| 734,916 | Marks | July 28, 1903 |
| 2,682,892 | Picard | July 6, 1954 |
| 2,930,607 | Hutzenlaub | Mar. 29, 1960 |
| 2,950,104 | Bowser et al. | Aug. 23, 1960 |

FOREIGN PATENTS

| | | |
|---|---|---|
| 1,137,237 | France | Jan. 7, 1957 |
| 1,173,675 | France | Oct. 27, 1958 |